US012789148B2

(12) United States Patent
Amano et al.

(10) Patent No.: US 12,789,148 B2
(45) Date of Patent: Nov. 10, 2026

(54) ZEOLITE MEMBRANE COMPLEX, METHOD OF PRODUCING ZEOLITE MEMBRANE COMPLEX, AND SEPARATION METHOD

(71) Applicant: NGK INSULATORS, LTD., Nagoya-City (JP)

(72) Inventors: Nao Amano, Ichinomiya-City (JP); Kenichi Noda, Nagoya-City (JP); Naoto Kinoshita, Nagoya-City (JP); Takahiro Nakanishi, Nagoya-City (JP); Azumi Hirane, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 274 days.

(21) Appl. No.: 18/782,373

(22) Filed: Jul. 24, 2024

(65) Prior Publication Data

US 2024/0375062 A1 Nov. 14, 2024

Related U.S. Application Data

(63) Continuation of application No. PCT/JP2023/005469, filed on Feb. 16, 2023.

(30) Foreign Application Priority Data

Feb. 28, 2022 (JP) ................................. 2022-029614

(51) Int. Cl.

| | |
|---|---|
| ***B01D 71/02*** | (2006.01) |
| ***B01D 53/02*** | (2006.01) |
| ***B01D 69/10*** | (2006.01) |

(52) U.S. Cl.

CPC ......... *B01D 71/0281* (2022.08); *B01D 53/02* (2013.01); *B01D 69/10* (2013.01); *B01D 2323/40* (2013.01); *B01D 2323/46* (2013.01)

(58) Field of Classification Search

CPC .... B01D 71/0281; B01D 71/02; B01D 71/56; B01D 53/02; B01D 53/22; B01D 53/225;

(Continued)

(56) References Cited

U.S. PATENT DOCUMENTS

| | | | | |
|---|---|---|---|---|
| 11,458,441 B2 * | 10/2022 | Choi | .................. | B01D 71/0281 |
| 2007/0045174 A1 * | 3/2007 | Yeung | ................ | B01D 67/0051 210/500.21 |

(Continued)

FOREIGN PATENT DOCUMENTS

| | | |
|---|---|---|
| JP | 2004-083375 A | 3/2004 |
| JP | 2005-289735 A | 10/2005 |

(Continued)

OTHER PUBLICATIONS

English translation of the International Preliminary Report on Patentability (Chapter I) dated Sep. 12, 2024 (Application No. PCT/JP2023/005469).

(Continued)

*Primary Examiner* — Dung H Bui

(74) *Attorney, Agent, or Firm* — Muncy, Geissler, Olds & Lowe, P.C.

(57) ABSTRACT

A zeolite membrane complex includes a porous support and a zeolite membrane formed on the support. In the zeolite membrane, a Si/Al ratio which is a molar ratio becomes larger as it goes from an interface portion with the support toward a membrane inner portion and the Si/Al ratio becomes smaller as it goes from the membrane inner portion toward a surface portion opposite to the support.

8 Claims, 9 Drawing Sheets

(58) Field of Classification Search

CPC ................ B01D 69/10; B01D 2323/40; B01D 2323/46; B01D 53/228; B01D 61/025; B01D 61/362; B01D 61/363; B01D 63/063; B01D 63/088; B01D 69/02; B01D 69/108; B01D 2325/022; B01D 67/0051; B01D 69/12; C01B 39/48

See application file for complete search history.

(56) References Cited

U.S. PATENT DOCUMENTS

| | | | | |
|---|---|---|---|---|
| 2007/0265484 | A1* | 11/2007 | Li | B01D 71/0213 585/818 |
| 2014/0291245 | A1 | 10/2014 | Inukai et al. | |
| 2015/0151242 | A1 | 6/2015 | Nagano et al. | |
| 2017/0225130 | A1 | 8/2017 | Noda et al. | |
| 2019/0001278 | A1 | 1/2019 | Miyahara et al. | |
| 2020/0001250 | A1* | 1/2020 | Miyahara | B01D 53/228 |
| 2020/0122096 | A1 | 4/2020 | Noda et al. | |
| 2020/0399136 | A1* | 12/2020 | Anthonis | C01B 37/02 |
| 2020/0406202 | A1* | 12/2020 | Miyahara | B01D 69/108 |
| 2021/0016233 | A1* | 1/2021 | Noda | B01D 53/228 |
| 2021/0154623 | A1* | 5/2021 | Onuki | B01D 53/228 |
| 2022/0241732 | A1* | 8/2022 | Liu | B01D 61/363 |
| 2022/0379270 | A1* | 12/2022 | Lin | B01D 71/028 |
| 2024/0246893 | A1* | 7/2024 | Sawamura | C07C 29/152 |
| 2024/0367986 | A1* | 11/2024 | Choi | B01D 69/12 |

FOREIGN PATENT DOCUMENTS

| | | | |
|---|---|---|---|
| JP | 4759724 | B2 | 8/2011 |
| JP | 2014-198308 | A | 10/2014 |
| JP | 6748104 | B2 | 9/2020 |
| WO | 2014/007140 | A1 | 1/2014 |
| WO | 2016/084846 | A1 | 6/2016 |
| WO | 2017/169591 | A1 | 10/2017 |
| WO | 2018/225787 | A1 | 12/2018 |

OTHER PUBLICATIONS

International Search Report and Written Opinion (Application No. PCT/JP2023/005469) dated May 9, 2023 (8 pages).

* cited by examiner

ZEOLITE MEMBRANE COMPLEX, METHOD OF PRODUCING ZEOLITE MEMBRANE COMPLEX, AND SEPARATION METHOD

CROSS-REFERENCE TO RELATED APPLICATIONS

The present application is a continuation application of International Application No. PCT/JP2023/005469 filed on Feb. 16, 2023, which claims priority to Japanese Patent Application No. 2022-029614 filed on Feb. 28, 2022. The contents of these applications are incorporated herein by reference in their entirety.

TECHNICAL FIELD

The present invention relates to a zeolite membrane complex, a method of producing a zeolite membrane complex, and a separation method.

BACKGROUND ART

It is well known, in general, that a zeolite membrane having a high Si/Al ratio has high hydrothermal resistance and a zeolite membrane having a low Si/Al ratio has high water flux. Then, WO 2018/225787 (Document 1) discloses a separation membrane in which a first zeolite membrane (high silica zeolite membrane) having a high Si/Al ratio and a second zeolite membrane (low silica zeolite membrane) having a low Si/Al ratio are laminated in order to achieve both high hydrothermal resistance and high water flux.

Further, Patent Publication No. 6748104 (Document 2) discloses a crystalline pure silica membrane formed on a surface of a porous base material. The pure silica membrane has a CHA-type crystal structure and a region from a membrane surface up to the depth of 2 μm consists of only silicon and oxygen. Since the pure silica membrane has high hydrophobicity in Document 2, it is thought that the water flux is low. Patent Publication No. 4759724 (Document 3) discloses a zeolite membrane formed on a porous base material, in which a Si/Al ratio thereof slopes continuously or step by step in a depth direction of the membrane. WO 2017/169591 (Document 4) discloses a method of producing a porous support, and the like. Japanese Patent Application Laid Open Gazette No. 2004-83375 (Document 5) discloses a method of producing a DDR-type zeolite.

In the separation membrane disclosed in Document 1, since the zeolite membrane having a high Si/Al ratio (i.e., a low polarity) is in contact with a porous support having a polar hydroxyl group in a surface thereof, adhesion with the support becomes low and membrane peeling easily occurs. Further, in Document 1, since the first zeolite membrane is formed by using one starting material solution and then the second zeolite membrane is formed by using another starting material solution, it takes a long time to produce the separation membrane.

SUMMARY OF THE INVENTION

The present invention is intended for a zeolite membrane complex, and it is an object of the present invention to provide a zeolite membrane complex having high water flux and high hydrothermal resistance and capable of suppressing membrane peeling, and it is another object of the present invention to efficiently produce the zeolite membrane complex.

A first aspect of the present invention is a zeolite membrane complex, and the zeolite membrane complex of the first aspect includes a porous support and a zeolite membrane formed on the support. In the zeolite membrane, a Si/Al ratio which is a molar ratio becomes higher as it goes from an interface portion with the support toward a membrane inner portion and the Si/Al ratio becomes lower as it goes from the membrane inner portion toward a surface portion opposite to the support.

According to the present invention, it is possible to provide a zeolite membrane complex having high water flux and high hydrothermal resistance and capable of suppressing membrane peeling.

A second aspect of the present invention is the zeolite membrane complex of the first aspect, in which in a change in the Si/Al ratio in a thickness direction in the zeolite membrane, a length of a range in which the Si/Al ratio is two times or more as high as the Si/Al ratio in the surface portion is 25% or more of a thickness of the zeolite membrane.

A third aspect of the present invention is the zeolite membrane complex of the first or second aspect, in which in a change in the Si/Al ratio in a thickness direction in the zeolite membrane, a maximum Si/Al ratio is 180 or more.

A fourth aspect of the present invention is the zeolite membrane complex of any one of the first to third aspects, in which the Si/Al ratio in the surface portion of the zeolite membrane is 120 or less.

A fifth aspect of the present invention is the zeolite membrane complex of any one of the first to fourth aspects, in which in a change in the Si/Al ratio in a thickness direction in the zeolite membrane, a length of a range between a position at which the Si/Al ratio from the interface portion toward the membrane inner portion first becomes ½ of a maximum Si/Al ratio of the zeolite membrane and the support is 25% or more of a thickness of the zeolite membrane.

A sixth aspect of the present invention is the zeolite membrane complex of any one of the first to fifth aspects, in which zeolite forming the zeolite membrane is an 8-membered ring zeolite.

A seventh aspect of the present invention is a method of producing a zeolite membrane complex, and the method of producing a zeolite membrane complex of the seventh aspect includes a) preparing a starting material solution by mixing a Si source and two types of Al sources having different solubilities in water into water, b) immersing a porous support in the starting material solution, and c) forming a zeolite membrane on the support by heating the starting material solution. In the operation c), hydrothermal synthesis is performed at a temperature at which substantially all of one Al source of the two types of Al sources contained in the starting material solution is dissolved and at least part of the other Al source is not dissolved and then hydrothermal synthesis is performed at another temperature higher than the temperature. It is therefore possible to efficiently produce the above-described zeolite membrane complex.

An eighth aspect of the present invention is a separation method, and the separation method of the eighth aspect includes a) preparing the zeolite membrane complex according to any one of the first to sixth aspects and b) supplying a mixed substance containing a plurality of types of gases or liquids to the zeolite membrane complex and causing a substance with high permeability in the mixed substance to permeate the zeolite membrane complex, to be separated from any other substance.

These and other objects, features, aspects and advantages of the present invention will become more apparent from the following detailed description of the present invention when taken in conjunction with the accompanying drawings.

DETAILED DESCRIPTION

Figure 1:
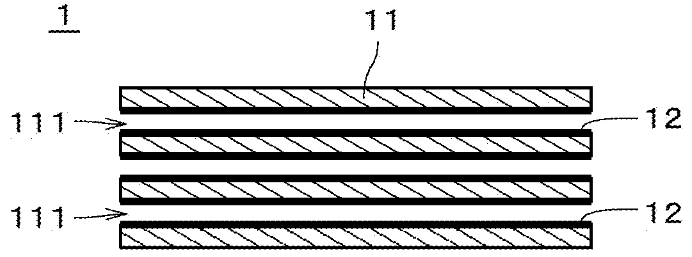
FIG. 1 is a cross-sectional view of a zeolite membrane complex.
Figure 2:
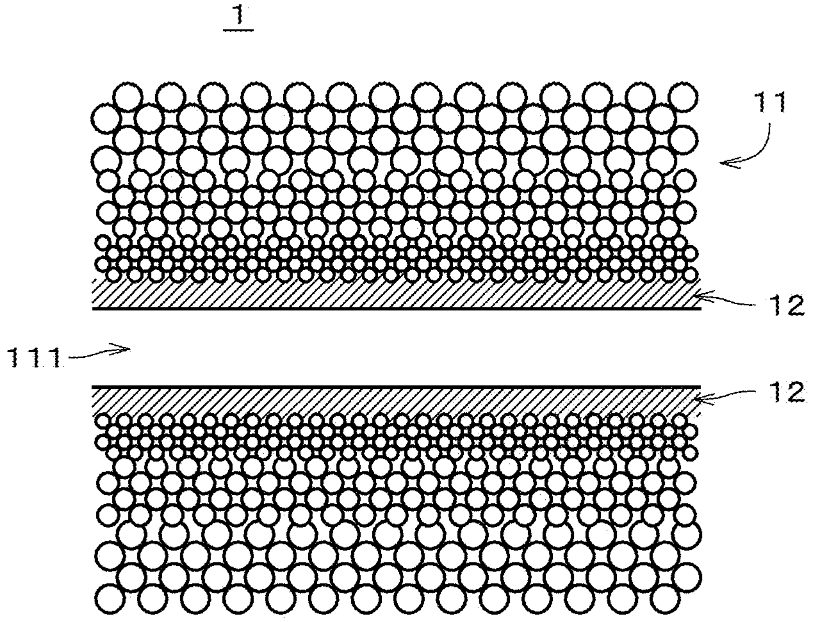
FIG. 2 is a cross-sectional view enlargedly showing part of the zeolite membrane complex.

FIG. 1 is a cross-sectional view of a zeolite membrane complex 1. FIG. 2 is a cross-sectional view enlargedly showing part of the zeolite membrane complex 1. The zeolite membrane complex 1 includes a porous support 11 and a zeolite membrane 12 formed on the support 11. A zeolite membrane is at least obtained by forming zeolite on a surface of the support 11 in a membrane form and does not include a membrane obtained by simply dispersing zeolite particles in an organic membrane. Further, the zeolite membrane 12 may contain two or more types of zeolites having different structures and compositions. In FIG. 1, the zeolite membrane 12 is represented by a thick line. In FIG. 2, the zeolite membrane 12 is hatched. Further, in FIG. 2, the thickness of the zeolite membrane 12 is shown larger than the actual one.

The support 11 is a porous member that gas and liquid can permeate. In the exemplary case shown in FIG. 1, the support 11 is a monolith-type support having an integrally and continuously molded columnar main body provided with a plurality of through holes 111 extending in a longitudinal direction (i.e., a left and right direction in FIG. 1). In the exemplary case shown in FIG. 1, the support 11 has a substantially columnar shape. A cross section perpendicular to the longitudinal direction of each of the through holes 111 (i.e., cells) is, for example, substantially circular. In FIG. 1, the diameter of each through hole 111 is larger than the actual diameter, and the number of through holes 111 is smaller than the actual number. The zeolite membrane 12 is formed on an inner surface of each through hole 111, covering substantially the entire inner surface of the through hole 111.

The length of the support 11 (i.e., the length in the left and right direction of FIG. 1) is, for example, 10 cm to 200 cm. The outer diameter of the support 11 is, for example, 0.5 cm to 30 cm. The distance between the central axes of adjacent through holes 111 is, for example, 0.3 mm to 10 mm. The surface roughness (Ra) of the support 11 is, for example, 0.1 μm to 5.0 μm, and preferably 0.2 μm to 2.0 μm. Further, the shape of the support 11 may be, for example, honeycomb-like, flat plate-like, tubular, cylindrical, columnar, polygonal prismatic, or the like. When the support 11 has a tubular or cylindrical shape, the thickness of the support 11 is, for example, 0.1 mm to 10 mm.

As the material for the support 11, various materials (for example, ceramics or a metal) may be adopted only if the materials ensure chemical stability in the process step of forming the zeolite membrane 12 on the surface thereof. In the present preferred embodiment, the support 11 is formed of a ceramic sintered body. Examples of the ceramic sintered body which is selected as a material for the support 11 include alumina, silica, mullite, zirconia, titania, yttria, silicon nitride, silicon carbide, and the like. In the present preferred embodiment, the support 11 contains at least one type of alumina, mullite, and zirconia.

The support 11 may contain an inorganic binder. As the inorganic binder, at least one of titania, mullite, easily sinterable alumina, silica, glass frit, a clay mineral, and easily sinterable cordierite can be used.

The average pore diameter of the support 11 is, for example, 0.01 μm to 70 μm, and preferably 0.05 μm to 25 μm. The average pore diameter of the support 11 in the vicinity of the surface on which the zeolite membrane 12 is formed is 0.01 μm to 1 μm, and preferably 0.05 μm to 0.5 μm. The average pore diameter can be measured by using, for example, a mercury porosimeter, a perm porometer, or a nano-perm porometer. Regarding the pore diameter distribution of the entire support 11 including the surface and the inside thereof, D5 is, for example, 0.01 μm to 50 μm, D50 is, for example, 0.05 μm to 70 μm, and D95 is, for example, 0.1 μm to 2000 μm. The porosity of the support 11 in the vicinity of the surface on which the zeolite membrane 12 is formed is, for example, 25% to 50%.

The support 11 has, for example, a multilayer structure in which a plurality of layers with different average pore diameters are layered in a thickness direction. The average pore diameter and the sintered particle diameter in a surface layer including the surface on which the zeolite membrane 12 is formed are smaller than those in layers other than the surface layer. The average pore diameter in the surface layer of the support 11 is, for example, 0.01 μm to 1 μm, and preferably 0.05 μm to 0.5 μm. When the support 11 has a multilayer structure, the materials for the respective layers can be those described above. The materials for the plurality of layers constituting the multilayer structure may be the same as or different from one another.

The zeolite membrane 12 is a porous membrane having pores. The zeolite membrane 12 can be used as a separation membrane for separating a specific substance from a mixed substance in which a plurality of types of substances are mixed, by using a molecular sieving function. As compared with the specific substance, any one of the other substances is harder to permeate the zeolite membrane 12. In other words, the permeance of any other substance through the zeolite membrane 12 is smaller than that of the above-described specific substance.

The thickness of the zeolite membrane 12 is, for example, 0.05 μm to 30 μm, preferably 0.1 μm to 20 μm, and more preferably 0.5 μm to 10 μm. When the thickness of the zeolite membrane 12 is increased, the separation performance increases. When the thickness of the zeolite membrane 12 is reduced, the permeance increases. The surface roughness (Ra) of the zeolite membrane 12 is, for example, 5 μm or less, preferably 2 μm or less, more preferably 1 μm or less, and further preferably 0.5 μm or less.

The average pore diameter of the zeolite membrane 12 is, for example, 1 nm or less. The average pore diameter of the zeolite membrane 12 is preferably not smaller than 0.2 nm and not larger than 0.8 nm, more preferably not smaller than 0.3 nm and not larger than 0.7 nm, and further preferably not smaller than 0.3 nm and not larger than 0.6 nm. When the average pore diameter is larger than 1 nm, the separation performance is sometimes reduced. Further, when the average pore diameter is smaller than 0.2 nm, the permeance is sometimes reduced. The average pore diameter of the zeolite membrane 12 is smaller than that of the support 11 in the vicinity of the surface on which the zeolite membrane 12 is formed.

When the maximum number of membered rings of the zeolite forming the zeolite membrane 12 is n, an arithmetic average of the short diameter and the long diameter of an n-membered ring pore is defined as the average pore diameter. The n-membered ring pore refers to a pore in which the number of oxygen atoms in the part where the oxygen atoms and later-described T atoms are bonded to form a ring structure is n. When the zeolite has a plurality of types of n-membered ring pores having the same n, an arithmetic average of the short diameters and the long diameters of all types of n-membered ring pores is defined as the average pore diameter of the zeolite. Thus, the average pore diameter of the zeolite membrane is uniquely determined depending on the framework structure of the zeolite and can be obtained from values disclosed in “Database of Zeolite Structures” [online], internet <URL: http://www.iza-structure.org/databases/> of the International Zeolite Association.

There is no particular limitation on the type of the zeolite forming the zeolite membrane 12, but the zeolite membrane 12 may be formed of, for example, AEI-type, AEN-type, AFN-type, AFV-type, AFX-type, BEA-type, CHA-type, DDR-type, ERI-type, ETL-type, FAU-type (X-type, Y-type), GIS-type, LEV-type, LTA-type, MEL-type, MFI-type, MOR-type, PAU-type, RHO-type, SAT-type, SOD-type zeolite, or the like.

From the viewpoint of an improvement in the separation performance, it is preferable that the maximum number of membered rings of the zeolite forming the zeolite membrane 12 should be 8. In other words, the zeolite is preferably an 8-membered ring zeolite. The zeolite membrane 12 is formed of, for example, DDR-type zeolite. In other words, the zeolite membrane 12 is a zeolite membrane formed of the zeolite having a structure code of “DDR” which is designated by the International Zeolite Association. In this case, the unique pore diameter of the zeolite forming the zeolite membrane 12 is 0.36 nm×0.44 nm, and the average pore diameter is 0.40 nm.

Typically, the zeolite forming the zeolite membrane 12 is aluminosilicate zeolite in which atoms (T-atoms) each located at the center of an oxygen tetrahedron ($TO_4$) constituting the zeolite include silicon (Si) and aluminum (Al). Some of the T-atoms may be replaced by other elements. The zeolite membrane 12 may contain an alkali metal. The alkali metal is, for example, sodium (Na) or potassium (K).

Figure 3:
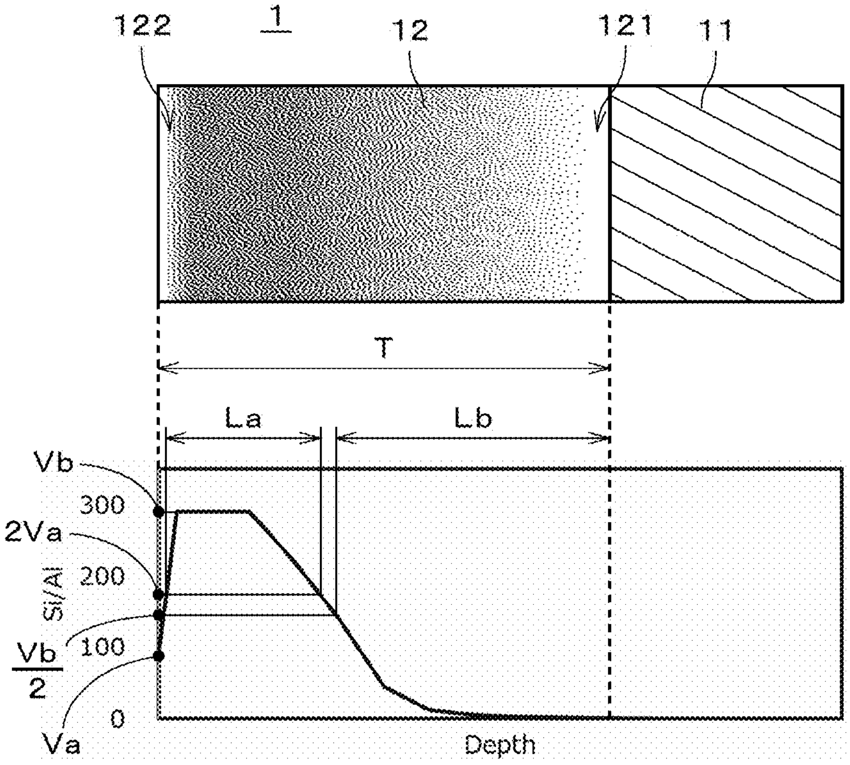
FIG. 3 is a view used for explaining a change in the Si/Al ratio in a thickness direction in the zeolite membrane.

FIG. 3 is a view used for explaining a change in the Si/Al ratio in the thickness direction in the zeolite membrane 12. In the lower stage of FIG. 3, a graph shows a change in the Si/Al ratio in the thickness direction in the zeolite membrane 12. The vertical axis in the lower stage of FIG. 3 indicates the Si/Al ratio and the horizontal axis indicates a position in the thickness direction (depth direction) with the surface of the zeolite membrane 12 as “0” (the same applies to later-described FIGS. 8A to 8E and FIGS. 9A to 9C). The upper stage of FIG. 3 shows part of a cross section of the zeolite membrane 12 and the support 11, and in the cross section of the zeolite membrane 12, applied is gradation which becomes darker as the Si/Al ratio increases. The Si/Al ratio is a molar ratio and a value obtained by dividing the number of moles of Si atoms by the number of moles of Al atoms. The change in the Si/Al ratio in the thickness direction can be obtained by depth profile composition analysis using the X-ray photoelectron spectroscopy (XPS) on the zeolite membrane 12 after being cleaned (being subjected to sputtering of 1 nm for removing a surface contamination layer). Further, in the change in the Si/Al ratio in the thickness direction, a range in the thickness direction where the Si/Al ratio is lower than 1 is in the support 11.

The zeolite membrane 12 has an interface portion 121 and a surface portion 122. The interface portion 121 is a portion forming an interface with the support 11 and the surface portion 122 is a portion forming a surface opposite to the support 11. In the zeolite membrane 12, assuming a portion between the interface portion 121 and the surface portion 122 as a membrane inner portion, the Si/Al ratio is changed almost continuously in the thickness direction from the interface portion 121 through the membrane inner portion up to the surface portion 122. Specifically, as shown in the lower stage of FIG. 3, the Si/Al ratio gradually becomes higher as it goes from the interface portion 121 toward the membrane inner portion and the Si/Al ratio gradually becomes lower as it goes from the membrane inner portion toward the surface portion 122. In other words, the change in the Si/Al ratio in the thickness direction shows a mountain shape having a gradient which increases toward the membrane inner portion on each of the side of the interface portion 121 and the side of the surface portion 122. Actually, a value of the Si/Al ratio sometimes goes up and down due to the measurement variation. In this case, when a measurement is performed from a membrane surface toward the support 11, an actually measured value is used at the membrane surface, an average value is used at the second point, which is an average of three measured values for the second point and the preceding and following points thereof, and an average value is used at the third point or later, which is an average of five measured values for the third point and the preceding two points and following two points thereof, to thereby obtain the change in the Si/Al ratio in the thickness direction. Then, in a case where the change in the Si/Al ratio continuously tends to increase or decrease (except, however, the vicinity of a position in the membrane inner portion where the increasing tendency turns to the decreasing tendency), it is determined that the Si/Al ratio is continuously changed. Further, at a position in the membrane inner portion, for example, when the Al is lower than a detection lower limit value, the Si/Al ratio at the position may be excluded. Furthermore, the Si/Al ratio at the position may be interpolated by using values in the vicinity thereof or calculated by using the detection lower limit value of Al.

In the zeolite membrane 12, the Si/Al ratio Va in the surface portion 122 is relatively low and the surface portion 122 includes many Al. The polarity of the surface portion 122 thereby becomes higher and the hydrophilic property becomes higher, and high water flux is achieved. The Si/Al ratio Va in the surface portion 122 is, for example, lower than half of a maximum Si/Al ratio Vb described later. The Si/Al ratio Va is preferably not higher than 120, more preferably not higher than 110, and further preferably not higher than 100. It is thereby possible to reliably improve the water flux. A lower limit of the Si/Al ratio Va in the surface portion 122 is not particularly limited but is, for example, 1.

In the zeolite membrane 12, since the Si/Al ratio in the membrane inner portion is relatively high, high hydrothermal resistance is achieved. As described later, the hydrothermal resistance can be evaluated by the degree of decrease in the vacuum before and after the zeolite membrane complex 1 is immersed in heated water. In the change in the Si/Al ratio in the thickness direction, assuming that a range in the thickness direction where the Si/Al ratio is two times or more as high as the Si/Al ratio Va in the surface portion 122 is referred to as a "high Si/Al ratio range", a ratio (La/T) of a length La of the high Si/Al ratio range in the thickness direction to the thickness T of the zeolite membrane 12 is preferably 25% or more, more preferably 28% or more, and further preferably 30% or more. Further, the maximum Si/Al ratio Vb in the change in the Si/Al ratio in the thickness direction is preferably 180 or more, more preferably 200 or more, and further preferably 220 or more. An upper limit of the maximum Si/Al ratio Vb is not particularly limited but is, for example, 300. As described above, a portion in the zeolite membrane 12 in which the Si/Al ratio is high extends over a wide range, or/and since the maximum Si/Al ratio Vb is high, the hydrothermal resistance can be more reliably improved.

In the zeolite membrane 12, the Si/Al ratio in the interface portion 121 is relatively low, and membrane peeling is thereby suppressed. Though the reason why membrane peeling is suppressed in the zeolite membrane 12 is not always clear, since the interface portion 121 having a low Si/Al ratio and containing many Al also has a high polarity while a hydroxyl group in the surface of the support 11 has a polarity, it can be thought that adhesion between the zeolite membrane 12 and the surface of the support 11 increases. In the change in the Si/Al ratio in the thickness direction, assuming that a range in the thickness direction between a position at which the Si/Al ratio from the interface portion 121 toward the membrane inner portion first becomes ½ of the maximum Si/Al ratio Vb of the zeolite membrane 12 and the support 11 is referred to as an "interface-side specified range", a ratio (Lb/T) of a length Lb of the interface-side specified range in the thickness direction to the thickness T of the zeolite membrane 12 is preferably 25% or more, more preferably 30% or more, and further preferably 35% or more. It thereby becomes possible to more reliably suppress membrane peeling.

Next, with reference to FIG. 4, an exemplary flow of producing the zeolite membrane complex 1 will be described. In producing the zeolite membrane complex 1, first, seed crystals to be used for producing the zeolite membrane 12 are prepared (Step S11). As to the seed crystals, for example, DDR-type zeolite powder is synthesized by hydrothermal synthesis, and the seed crystals are acquired from the zeolite powder. The zeolite powder itself may be used as the seed crystals, or may be processed by pulverization or the like, to thereby acquire the seed crystals.

Subsequently, the porous support 11 is immersed in a dispersion liquid in which the seed crystals are dispersed, and the seed crystals are thereby deposited onto the support 11 (Step S12). Alternatively, the dispersion liquid in which the seed crystals are dispersed is brought into contact with a portion on the support 11 where the zeolite membrane 12 is to be formed, and the seed crystals are thereby deposited onto the support 11. A support with seed crystals deposited is thereby produced. The seed crystals may be deposited onto the support 11 by any other method.

Further, a starting material solution to be used for producing the zeolite membrane 12 is prepared (Step S13). The starting material solution is produced by mixing, for example, a Si source, two types of Al sources (hereinafter, referred to as a "first Al source" and a "second Al source"), structure-directing agent (SDA), and the like into water ($H_2O$). In the present exemplary process, the Si source is amorphous silica (e.g., silica sol). The Si source may be colloidal silica, fumed silica, sodium silicate, silicon alkoxide, water glass, or the like. The first Al source and the second Al source have different solubilities in water. Specifically, in a temperature range from an initial temperature to a first synthesis temperature in hydrothermal synthesis described later, the solubility of the first Al source in water is higher than that of the second Al source. The first Al source is, for example, a water-soluble aluminum compound, and examples of the first Al source include sodium aluminate, aluminum hydroxide, aluminum alkoxide, and the like. The second Al source is, for example, a poor water-soluble aluminum compound, and examples of the second Al source include boehmite, aluminum oxide, and the like. The SDA is, for example, an organic substance. As the SDA, for example, used is 1-adamantanamine, tetramethylammonium hydroxide, choline chloride, or the like. In the starting material solution, other raw materials, such as a Na source and the like, may be mixed.

After the starting material solution is prepared, the support 11 on which the seed crystals are deposited is immersed in the starting material solution (Step S14). After that, the DDR-type zeolite is caused to grow from the seed crystals as nuclei by the hydrothermal synthesis, to thereby form the DDR-type zeolite membrane 12 on the support 11 (Step S15). In the hydrothermal synthesis, the starting material solution is heated in two stages. In the present exemplary process, the starting material solution is heated from the initial temperature (for example, a room temperature) to the first synthesis temperature, and then maintained to be constant at the first synthesis temperature. When a predetermined time elapses from reaching the first synthesis temperature, the starting material solution is heated from the first synthesis temperature to a second synthesis temperature higher than the first synthesis temperature, and then maintained to be constant at the second synthesis temperature. When a predetermined time elapses from reaching the second synthesis temperature, the temperature of the starting material solution is returned to the vicinity of the initial temperature.

Figure 5A:
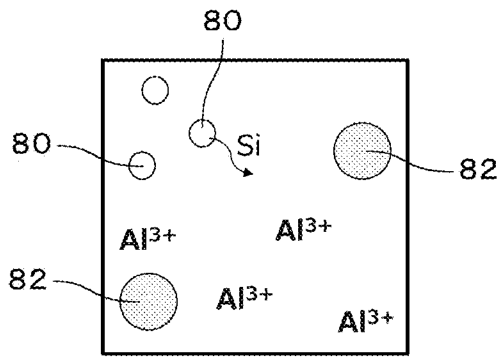
FIG. 5A is a view schematically showing a state of a starting material solution.
Figure 5B:
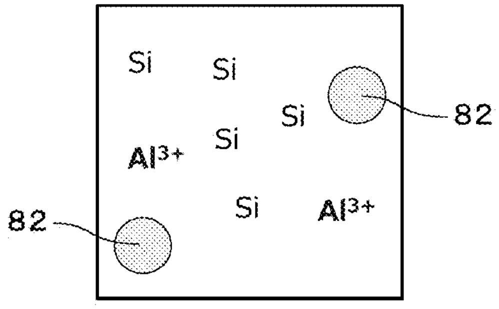
FIG. 5B is a view schematically showing another state of the starting material solution.
Figure 5C:
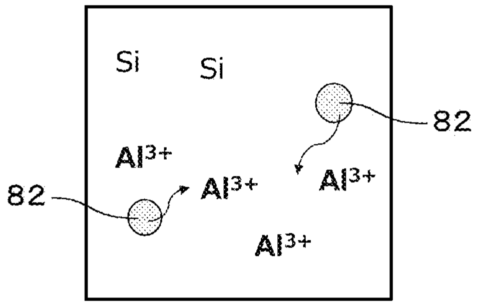
FIG. 5C is a view schematically showing still another state of the starting material solution.

FIGS. 5A to 5C are views each schematically showing a state of the starting material solution. In the starting material solution of the present exemplary process, in a state at the initial temperature, substantially all of the first water-soluble Al source is dissolved in water. In the period while the starting material solution is heated from the initial temperature to the first synthesis temperature and maintained, as shown in FIG. 5A, the Si source 80 dispersed in the starting material solution is gradually dissolved in water, and a Si concentration (i.e., a concentration of Si dissolved in water) in the starting material solution increases. As shown in the lower stage of FIG. 3, in the zeolite membrane 12, the Si/Al ratio thereby gradually becomes higher as it goes from the interface portion 121 toward the membrane inner portion. Depending on the amount of first Al source in the starting material solution, substantially all (e.g., 99% or more) of the first Al source may be dissolved in water at the first synthesis temperature. In the starting material solution at the first synthesis temperature, the second Al source 82 is hardly dissolved in water, being dispersed. In the starting material solution at the first synthesis temperature, part of the second Al source 82 may be dissolved in water. Further, as described above, even when the seed crystals are used, since the seed crystals grow while taking in Al dissolved in the starting material solution, the Si/Al ratio in the interface portion 121 is almost continuously changed in the thickness direction.

As shown in FIG. 5B, after all the Si source 80 is dissolved in water, the dissolved Si and Al are consumed for forming the zeolite membrane 12 at almost constant rate, and the Si/Al ratio becomes substantially constant in the vicinity of the maximum Si/Al ratio Vb. After that, in the period while the starting material solution is heated from the first synthesis temperature to the second synthesis temperature and maintained, as shown in FIG. 5C, the second Al source 82 dispersed in the starting material solution is gradually dissolved in water, and an Al concentration (i.e., a concentration of Al dissolved in water) in the starting material solution increases. In the zeolite membrane 12, the Si/Al ratio thereby gradually becomes lower as it goes from the membrane inner portion toward the surface portion 122. Thus, by controlling the amount of Si and the amount of Al in the starting material solution (synthetic sol), the zeolite membrane 12 in which the Si/Al ratio is changed continuously in a mountain-like form in the thickness direction is formed. The zeolite membrane 12 in which the Si/Al ratio is continuously changed can be regarded as a single layer membrane.

The first synthesis temperature in the present exemplary process is a temperature at which the first Al source is almost completely dissolved and the second Al source is not completely dissolved (i.e., at least part of the second Al source is not dissolved), and for example, 100 to 130° C. and preferably 120 to 130° C. The second synthesis temperature is a temperature higher than the first synthesis temperature, and for example, 130 to 150° C. and preferably 140 to 150° C. The time for maintaining the first synthesis temperature is, for example, 4 to 15 hours, and preferably 4 to 11 hours. The time for maintaining the second synthesis temperature is, for example, 1 to 10 hours, and preferably 2 to 7 hours. Total time for maintaining the first synthesis temperature and the second synthesis temperature is, for example, 5 to 25 hours. In the synthesis of the zeolite membrane 12, it is not always necessary to set the period for maintaining a constant temperature, and by changing the temperature change rate in heating as appropriate, for example, the zeolite membrane 12 in which the Si/Al ratio becomes higher as it goes from the interface portion 121 toward the membrane inner portion and the Si/Al ratio becomes lower as it goes from the membrane inner portion toward the surface portion 122 may be formed.

After the hydrothermal synthesis is finished, the support 11 and the zeolite membrane 12 are washed with pure water. The support 11 and the zeolite membrane 12 after being washed are dried at, for example, 80° C. After drying the support 11 and the zeolite membrane 12, the heat treatment is performed on the zeolite membrane 12, to thereby completely burn and remove the SDA in the zeolite membrane 12 and allow micropores in the zeolite membrane 12 to penetrate the zeolite membrane 12. The above-described zeolite membrane complex 1 is thereby obtained.

Figure 6:
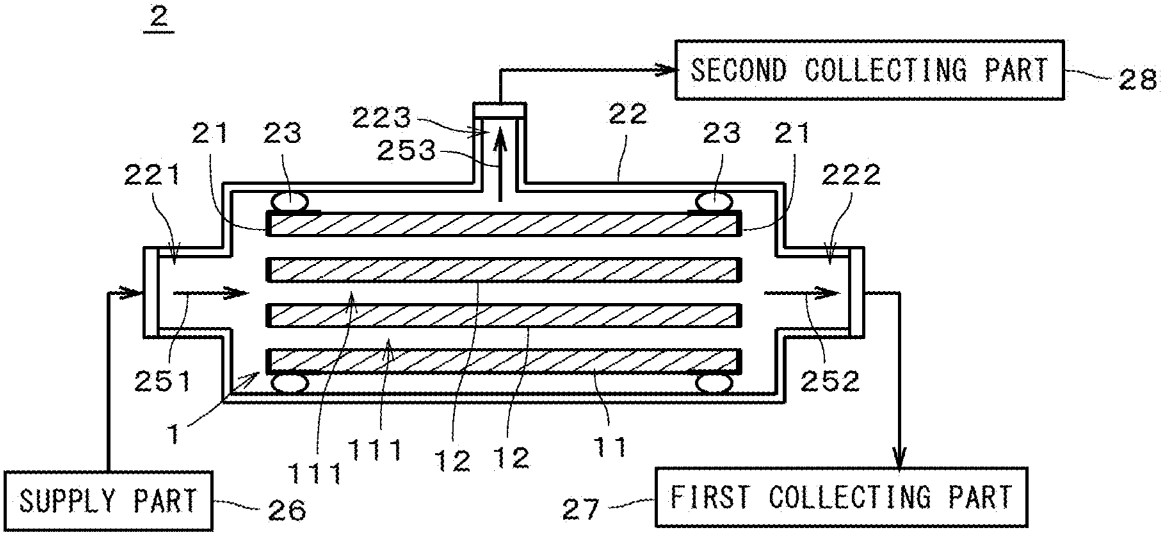
FIG. 6 is a view showing a separation apparatus.
Figure 7:
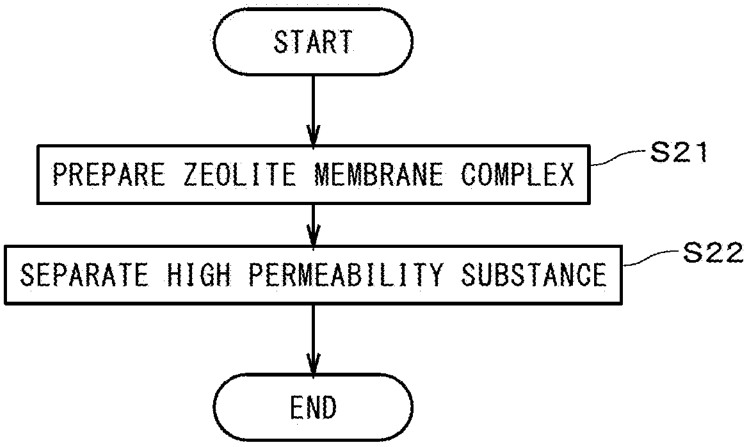
FIG. 7 is a flowchart showing a flow of separating a mixed substance.
Figure 8A:
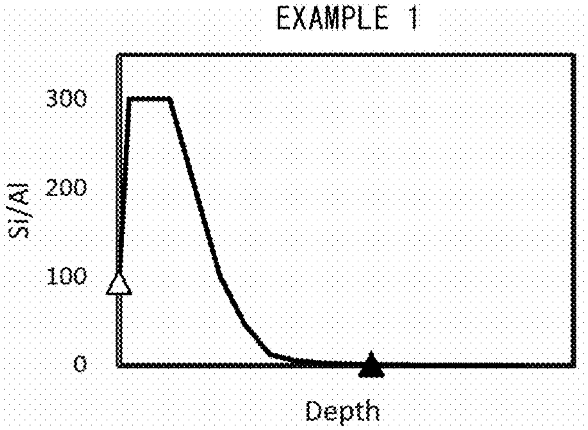
FIG. 8A is a graph showing a change in the Si/Al ratio in the thickness direction in a zeolite membrane.
Figure 8B:
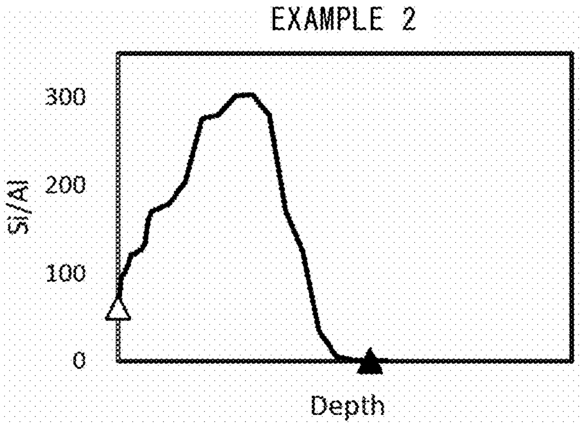
FIG. 8B is a graph showing a change in the Si/Al ratio in the thickness direction in a zeolite membrane.
Figure 8C:
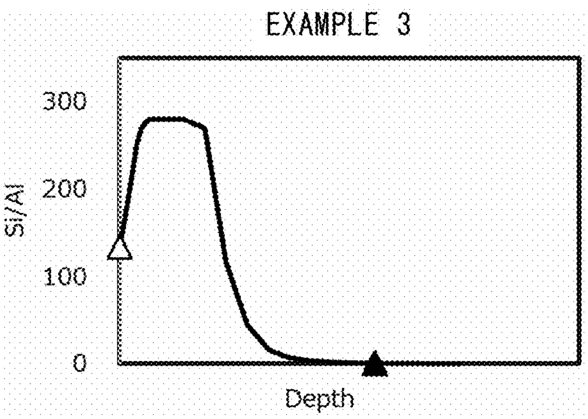
FIG. 8C is a graph showing a change in the Si/Al ratio in the thickness direction in a zeolite membrane.
Figure 8D:
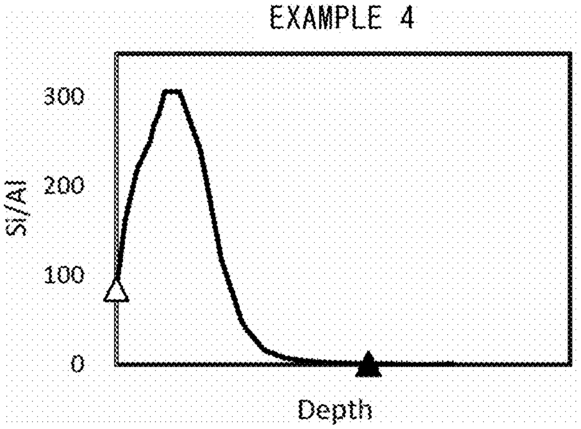
FIG. 8D is a graph showing a change in the Si/Al ratio in the thickness direction in a zeolite membrane.
Figure 8E:
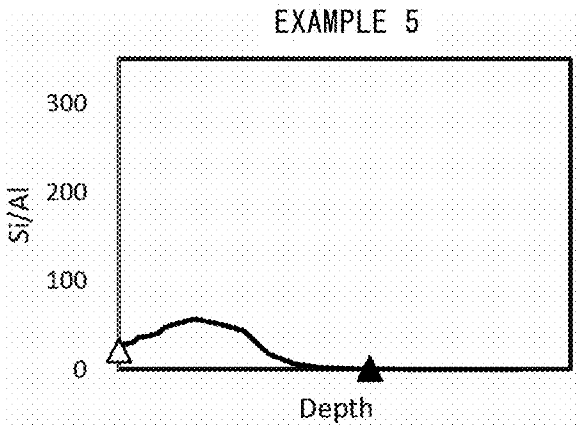
FIG. 8E is a graph showing a change in the Si/Al ratio in the thickness direction in a zeolite membrane.

Next, with reference to FIGS. 6 and 7, separation of a mixed substance by using the zeolite membrane complex 1 will be described. FIG. 6 is a view showing a separation apparatus 2. FIG. 7 is a flowchart showing a flow of separating the mixed substance, performed by the separation apparatus 2.

In the separation apparatus 2, a mixed substance containing a plurality of types of fluids (i.e., gases or liquids) is supplied to the zeolite membrane complex 1, and a substance with high permeability (hereinafter, referred to also as a "high permeability substance") in the mixed substance is caused to permeate the zeolite membrane complex 1, to be thereby separated from the mixed substance. Separation in the separation apparatus 2 may be performed, for example, in order to extract a high permeability substance from a mixed substance, or in order to concentrate a substance with low permeability (hereinafter, referred to also as a "low permeability substance").

The mixed substance (i.e., mixed fluid) may be a mixed gas containing a plurality of types of gases, may be a mixed liquid containing a plurality of types of liquids, or may be a gas-liquid two-phase fluid containing both a gas and a liquid.

The mixed substance contains at least one type of, for example, hydrogen ($H_2$), helium (He), nitrogen ($N_2$), oxygen ($O_2$), water ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde. The above-described high permeability substance is at least one type of, for example, $H_2$, He, $N_2$, $O_2$, $CO_2$, $NH_3$, and $H_2O$, and preferably $H_2O$.

The nitrogen oxide is a compound of nitrogen and oxygen. The above-described nitrogen oxide is, for example, a gas called NOx such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), dinitrogen pentoxide ($N_2O_5$), or the like.

The sulfur oxide is a compound of sulfur and oxygen. The above-described sulfur oxide is, for example, a gas called $SO_X$ such as sulfur dioxide ($SO_2$), sulfur trioxide ($SO_3$), or the like.

The sulfur fluoride is a compound of fluorine and sulfur. The above-described sulfur fluoride is, for example, disulfur difluoride (F—S—S—F, S=$SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with not less than 1 and not more than 8 carbon atoms. The C3 to C8 hydrocarbons may be any one of a linear-chain compound, a side-chain compound, and a ring compound. Further, the C2 to C8 hydrocarbons may either be a saturated hydrocarbon (i.e., in which there is no double bond or triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2{=}CHCH_2CH_3$), 2-butene ($CH_3CH{=}CHCH_3$), or isobutene ($CH_2{=}C(CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C_6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2HSOH$), isopropanol (2-propanol) ($CH_3CH(OH)CH_3$), ethylene glycol ($CH_2(OH)CH_2(OH)$), butanol ($C_4H_9OH$), or the like.

The mercaptans are an organic compound having hydrogenated sulfur (SH) at the terminal end thereof, and are a substance also referred to as thiol or thioalcohol. The above-described mercaptans are, for example, methyl mercaptan ($CH_3SH$), ethyl mercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether ($(CH_3)_2O$), methyl ethyl ether ($C_2H_5OCH_3$), diethyl ether ($(C_2H_5)_2O$), tetrahydrofuran ($(CH_2)_4O$), or the like.

The above-described ketone is, for example, acetone ($(CH_3)_2CO$), methyl ethyl ketone ($C_2H_5COCH_3$), diethyl ketone ($(C_2H_5)_2CO$), or the like.

The above-described aldehyde is, for example, acetaldehyde ($CH_3CHO$), propionaldehyde ($C_2H_5CHO$), butanal (butylaldehyde) ($C_3H_7CHO$), or the like.

In the following description, it is assumed that the mixed substance to be separated by the separation apparatus 2 is a mixed liquid containing a plurality of types of liquids and separation is performed by a pervaporation method.

The separation apparatus 2 includes the zeolite membrane complex 1, sealing parts 21, a housing 22, two sealing members 23, a supply part 26, a first collecting part 27, and a second collecting part 28. The zeolite membrane complex 1, the sealing parts 21, and the sealing members 23 are accommodated inside the housing 22. The supply part 26, the first collecting part 27, and the second collecting part 28 are disposed outside the housing 22 and connected to the housing 22.

The sealing parts 21 are members which are attached to both end portions in the longitudinal direction (i.e., in the left and right direction of FIG. 6) of the support 11 and cover and seal both end surfaces in the longitudinal direction of the support 11 and outer surfaces in the vicinity of the end surfaces. The sealing parts 21 prevent a liquid from flowing into or out from both the end surfaces of the support 11. The sealing part 21 is, for example, a plate-like member formed of glass or a resin. The material and the shape of the sealing part 21 may be changed as appropriate. Further, since the sealing part 21 is provided with a plurality of openings which coincide with the plurality of through holes 111 of the support 11, both ends of each through hole 111 of the support 11 in the longitudinal direction are not covered with the sealing parts 21. Therefore, the liquid or the like can flow into and out from the through hole 111 from both ends thereof.

There is no particular limitation on the shape of the housing 22 but is, for example, a tubular member having a substantially cylindrical shape. The housing 22 is formed of, for example, stainless steel or carbon steel. The longitudinal direction of the housing 22 is substantially in parallel to the longitudinal direction of the zeolite membrane complex 1. A supply port 221 is provided at an end portion on one side in the longitudinal direction of the housing 22 (i.e., an end portion on the left side in FIG. 6), and a first exhaust port 222 is provided at another end portion on the other side. A second exhaust port 223 is provided on a side surface of the housing 22. The supply part 26 is connected to the supply port 221. The first collecting part 27 is connected to the first exhaust port 222. The second collecting part 28 is connected to the second exhaust port 223. An internal space of the housing 22 is a sealed space that is isolated from the space around the housing 22.

The two sealing members 23 are arranged around the entire circumference between an outer surface of the zeolite membrane complex 1 and an inner surface of the housing 22 in the vicinity of both end portions of the zeolite membrane complex 1 in the longitudinal direction. Each of the sealing members 23 is a substantially annular member formed of a material that the liquid cannot permeate. The sealing member 23 is, for example, an O-ring formed of a flexible resin. The sealing members 23 come into close contact with the outer surface of the zeolite membrane complex 1 and the inner surface of the housing 22 around the entire circumferences thereof. In the exemplary case of FIG. 6, the sealing members 23 come into close contact with outer surfaces of the sealing parts 21 and indirectly come into close contact with the outer surface of the zeolite membrane complex 1 with the sealing parts 21 interposed therebetween. The portions between the sealing members 23 and the outer surface of the zeolite membrane complex 1 and between the sealing members 23 and the inner surface of the housing 22 are sealed, and it is thereby mostly or completely impossible for the liquid to pass through the portions.

The supply part 26 supplies the mixed liquid into the internal space of the housing 22 through the supply port 221. The supply part 26 includes, for example, a pump for pumping the mixed liquid toward the housing 22. The pump includes a temperature regulating part and a pressure regulating part which regulate the temperature and the pressure of the mixed liquid, respectively, to be supplied to the housing 22. The first collecting part 27 includes, for example, a storage container for storing the liquid led out from the housing 22 or a pump for transporting the liquid. The second collecting part 28 includes, for example, a vacuum pump for decompressing a space outside the outer surface of the zeolite membrane complex 1 inside the housing 22 (in other words, a space sandwiched between the two sealing members 23) and a cooling chiller trap for cooling and liquefying the gas permeating the zeolite membrane complex 1 while vaporizing.

When separation of the mixed liquid is performed, the above-described separation apparatus 2 is prepared and the zeolite membrane complex 1 is thereby prepared (FIG. 7: Step S21). Subsequently, the supply part 26 supplies a mixed liquid containing a plurality of types of liquids with different permeabilities to the zeolite membrane 12 into the internal space of the housing 22. For example, the main component of the mixed liquid includes water ($H_2O$) and ethanol ($C_2H_5OH$). The mixed liquid may contain any liquid other than water and ethanol. The pressure (i.e., feed pressure) of the mixed liquid to be supplied into the internal space of the housing 22 from the supply part 26 is, for example, 0.1 MPa to 2 MPa. The temperature of the mixed liquid is, for example, 10° C. to 200° C.

The mixed liquid supplied from the supply part 26 into the housing 22 is fed from the left end of the zeolite membrane complex 1 in this figure into the inside of each through hole 111 of the support 11 as indicated by an arrow 251. A high permeability substance which is a liquid with high permeability in the mixed liquid permeates the zeolite membrane 12 provided on the inner surface of each through hole 111 and the support 11 while vaporizing, and is led out from the outer surface of the support 11. The high permeability substance (for example, water) is thereby separated from a low permeability substance which is a liquid with low permeability (for example, ethanol) in the mixed liquid (Step S22).

The gas (hereinafter, referred to as a "permeate substance") led out from the outer peripheral surface of the support 11 is guided to the second collecting part 28 through the second exhaust port 223 as indicated by an arrow 253 and cooled and collected by the second collecting part 28 as a liquid. The pressure (i.e., permeate pressure) of the gas to be collected by the second collecting part 28 through the second exhaust port 223 is, for example, about 6.67 kPa (about 50 Torr). In the permeate substance, the low permeability substance permeating the zeolite membrane 12 may be included as well as the above-described high permeability substance.

Further, in the mixed liquid, a liquid (hereinafter, referred to as a "non-permeate substance") other than the substance which has permeated the zeolite membrane 12 and the support 11 passes through each through hole 111 of the support 11 from the left side to the right side in this figure and is collected by the first collecting part 27 through the first exhaust port 222 as indicated by an arrow 252. The pressure of the liquid to be collected by the first collecting part 27 through the first exhaust port 222 is, for example, substantially the same as the feed pressure.

The non-permeate substance may include a high permeability substance that has not permeated the zeolite membrane 12, as well as the above-described low permeability substance. The non-permeate substance collected by the first collecting part 27 may be, for example, circulated to the supply part 26 and supplied again into the housing 22.

Next, Examples 1 to 5 and Comparative Examples 1 to 3 of the zeolite membrane complex will be described.

(Production of Support with Seed Crystals Deposited)

In the same manner as the production method disclosed in WO 2017/169591 (above-described Document 4), which is incorporated herein by reference, a porous alumina support having a multilayer structure is produced. Further, in the same manner as the production method disclosed in Japanese Patent Application Laid Open Gazette No. 2004-83375 (above-described Document 5), which is incorporated herein by reference, the seed crystals which are the DDR-type zeolite crystal powder are produced. After that, by bringing the alumina support into contact with the solution in which the seed crystals are dispersed, the seed crystals are deposited on the alumina support.

(Preparation of Starting Material Solution)

After putting distilled water [a] g into a fluororesin jar (wide-mouth bottle), 1-adamantanamine (1-ADA, manufactured by Sigma-Aldrich Co. LLC) [b] g, sodium hydroxide (NaOH, manufactured by Sigma-Aldrich Co. LLC) [c] g, 30 weight percentage of silica sol (the product name: Snowtex-S, manufactured by Nissan Chemical Corporation) [d] g, sodium aluminate (manufactured by Wako Pure Chemical Corporation) [e] g, and boehmite powder (AlO(OH), the product name: C20, manufactured by TAIMIEI CHEMICALS Co., Ltd.) [f] g are added thereto and stirred, and the starting material solution which is a membrane formation sol is thereby prepared. In Examples 1 to 5 and Comparative Examples 1 to 3, respective masses a to f of the above-described raw materials are as shown in Table 1.

TABLE 1

| | Water a | 1-ADA b | NaOH c | Silica Sol d | Sodium Aluminate e | AlO(OH) f | 130° C. Synthesis Time g | 150° C. Synthesis Time h |
|---|---|---|---|---|---|---|---|---|
| Example 1 | 142.4 | 1.32 | 0.35 | 50 | 0.16 | 0.14 | 9 | 2 |
| Example 2 | 152.5 | 1.32 | 0.26 | 52 | 0.15 | 0.35 | 1 | 7 |
| Example 3 | 150.5 | 1.32 | 0.24 | 59 | 0.14 | 0.10 | 9 | 2 |
| Example 4 | 142.4 | 1.32 | 0.35 | 50 | 0.16 | 0.20 | 9 | 2 |
| Example 5 | 130.5 | 1.32 | 0.25 | 30 | 0.42 | 0.49 | 4 | 7 |
| Comparative Example 1 | 142.5 | 1.32 | 0.35 | 50 | 0.16 | 0 | 11 | 0 |
| Comparative Example 2 | 152.5 | 1.32 | 0.35 | 60 | 0.19 | 0 | 11 | 0 |
| Comparative Example 3 | 152.5 | 1.32 | 0.35 | 52 | 0 | 0.14 | 9 | 2 |

(Synthesis of Zeolite Membrane)

After placing the alumina support into a fluororesin inner cylinder (internal volume: 300 ml) of a stainless pressure-resistant container, the prepared starting material solution is put therein and heat treatment (hydrothermal synthesis) is performed thereon, to thereby form a DDR-type zeolite membrane. In the hydrothermal synthesis, the temperature of 130° C. is maintained for [g] hours and then the temperature of 150° C. is maintained for [h] hours. In Examples 1 to 5 and Comparative Examples 1 to 3, respective times [g] and [h] for maintaining the temperatures are as shown in Table 1. Next, the alumina support is washed and then dried at 80° C. for 12 hours or more. After that, by raising the temperature of the alumina support to 450° C. in the electric furnace and maintaining the temperature thereof for 50 hours, 1-adamantanamine is burned and removed. Through the above-described process, obtained is a zeolite membrane complex in each of Examples 1 to 5 and Comparative Examples 1 to 3, having the DDR-type zeolite membrane.

(Measurement of Si/Al Ratio)

The change in the Si/Al ratio in the thickness direction is obtained by depth profile composition analysis using the X-ray photoelectron spectroscopy (XPS) on the zeolite membrane after being cleaned (being subjected to sputtering of 1 nm for removing a surface contamination layer). As the measurement conditions, the X-ray source: monochromatic Al Kα ray (1486.6 eV), the X-ray beam diameter is 100 μm, the photoelectron extraction angle is 450 with respect to the normal of the sample, and sputtering is performed by using Ar monomer ions. Further, in the cleaning and the measurement, the sputter pitch, the acceleration voltage, the sputter rate, and the sputter end point are as shown in Table 2.

Furthermore, respective values of the sputter rate and the depth are expressed in terms of $SiO_2$.

TABLE 2

| Use | Sputter Pitch (nm) | Acceleration Voltage (kV) | Sputter Rate (nm/min.) | Sputter End Point (nm) |
|---|---|---|---|---|
| Cleaning | 1 | 1 | 1.1 | 1.0 |
| Depth Profiling | 10 | 2 | 14.8 | 101.6 |
| | 50 | 2 | 14.8 | 802.0 |

Figure 9A:
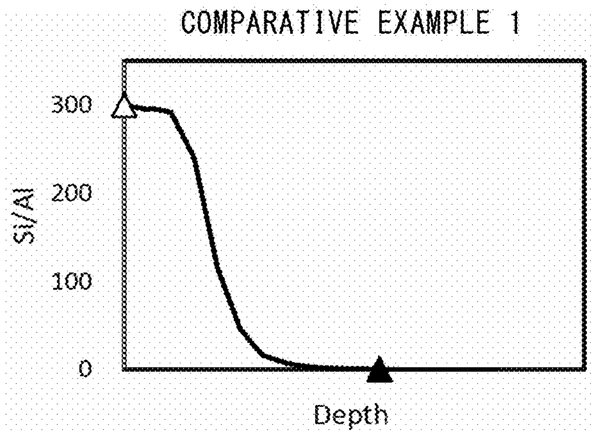
FIG. 9A is a graph showing a change in the Si/Al ratio in the thickness direction in a zeolite membrane of Comparative Example.
Figure 9B:
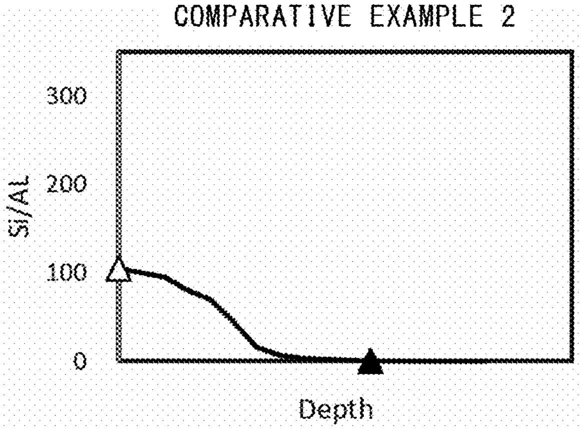
FIG. 9B is a graph showing a change in the Si/Al ratio in the thickness direction in a zeolite membrane of Comparative Example.
Figure 9C:
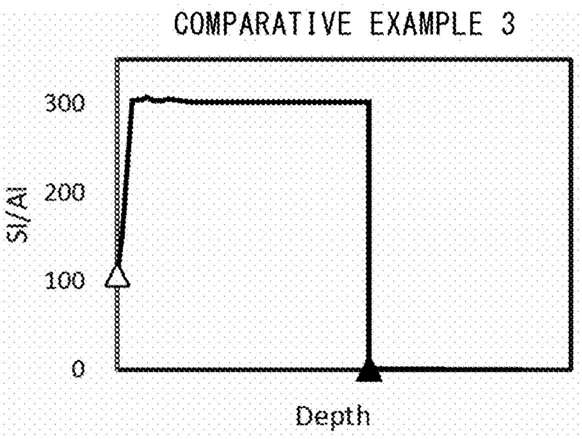
FIG. 9C is a graph showing a change in the Si/Al ratio in the thickness direction in a zeolite membrane of Comparative Example.

FIGS. 8A to 8E are graphs showing measurement results of the Si/Al ratios with respect to the zeolite membrane complexes in Examples 1 to 5, and FIGS. 9A to 9C are graphs showing measurement results of the Si/Al ratios with respect to the zeolite membrane complexes in Comparative Examples 1 to 3. FIGS. 8A to 8E and 9A to 9C each show a change in the Si/Al ratio in the thickness direction. Further, the Si/Al ratio in the surface portion is represented by a white triangle and the interface position (herein, a position at which the Si/Al ratio is lower than 1) is represented by a black triangle. Table 3 shows the Si/Al ratio in the surface portion, the ratio (La/T) of the length La of the high Si/Al ratio range to the thickness T of the zeolite membrane 12, the maximum Si/Al ratio, and the ratio (Lb/T) of the length Lb of the interface-side specified range to the thickness T of the zeolite membrane 12 in the zeolite membrane complex in each of Examples 1 to 5 and Comparative Examples 1 to 3 (see FIG. 3). These values are obtained from FIGS. 8A to 8E and 9A to 9C. Furthermore, in the change in the Si/Al ratio in the thickness direction, a range in the thickness direction where the Si/Al ratio is lower than 1 is in the alumina support. In a case where the support is formed of any substance other than alumina, a point at which the molar ratio of Si/(the total amount of elements other than oxygen forming the support) becomes lower than 1 is the interface.

(Evaluation of Membrane Performance)

By using the above-described separation apparatus 2, a mixed liquid of water and ethanol (mass ratio=50:50) is separated from each other by the pervaporation method at the temperature of 60° C., and the permeance of the liquid collected by the second collecting part 28 is measured. The density of the liquid is obtained by a density hydrometer and the quantity ratio of water to ethanol is measured. Then, the water flux and the separation factor are obtained from the permeance of the liquid and the quantity ratio of water to ethanol. The separation factor is a value obtained by dividing the water concentration (mass %) by the ethanol concentration. In Table 3, when the water flux is not lower than 2.5 $kg/m^2h$, the evaluation is "○ (circle)", when the water flux is lower than 2.5 $kg/m^2h$ and not lower than 2.0 $kg/m^2h$, the evaluation is "Δ (triangle)", and when the water flux is lower than 2.0 $kg/m^2h$, the evaluation is "x (cross)".

In the zeolite membrane complex in each of Examples 1 to 5 and Comparative Examples 2 and 3, the water flux is not lower than 2.0 $kg/m^2h$, and thus high water flux is achieved. Especially, in the zeolite membrane complex in each of Examples 1, 2, 4, and 5 and Comparative Examples 2 and 3 where the Si/Al ratio in the surface portion is not higher than 120, the water flux is not lower than 2.5 $kg/m^2h$. In Comparative Example 1, the water flux is low (lower than 20. $kg/m^2h$).

(Evaluation of Hydrothermal Resistance)

Figure 10:
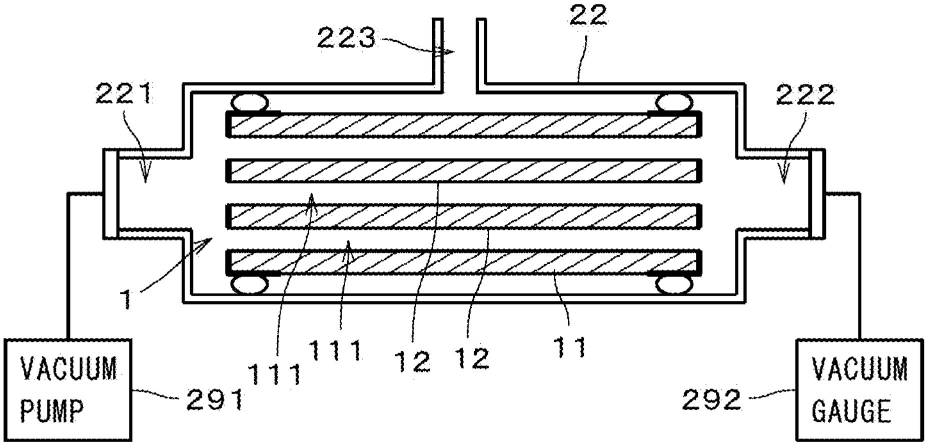
FIG. 10 is a view used for explaining measurement of the degree of vacuum.

In the evaluation of the hydrothermal resistance, like in FIG. 6, the degree of vacuum is measured by using the housing 22 in which the zeolite membrane complex 1 is accommodated. In the measurement of the degree of vacuum, as shown in FIG. 10, a vacuum pump 291 (Direct Drive Oil-Sealed Rotary Vacuum Pump manufactured by ULVAC KIKO, Inc., the model number: G-20DA, the pumping speed: 24 L/min, the ultimate pressure: 1.3 Pa, two-stage type) is connected to the port 221 that is one end portion of the housing 22 in the longitudinal direction and the housing

TABLE 3

| | Si/Al Ratio of Surface Portion | La/T | Maximum Si/Al Ratio | Lb/T | Water Flux | Hydrothermal Resistance | Membrane Peeling |
|---|---|---|---|---|---|---|---|
| Example 1 | 94 | 28% | 300 | 60% | ○ | ○ | ○ |
| Example 2 | 62 | 56% | 302 | 27% | ○ | ○ | Δ |
| Example 3 | 134 | 28% | 280 | 53% | Δ | ○ | ○ |
| Example 4 | 85 | 35% | 306 | 61% | ○ | Δ | ○ |
| Example 5 | 22 | 32% | 58 | 44% | ○ | Δ | ○ |
| Comparative Example 1 | 300 | 0% | 300 | 67% | x | ○ | ○ |
| Comparative Example 2 | 105 | 0% | 105 | 55% | ○ | x | ○ |
| Comparative Example 3 | 107 | 96% | 306 | 2% | ○ | ○ | x |

In the zeolite membrane complex in each of Examples 1 to 5, as shown in FIGS. 8A to 8E, the Si/Al ratio becomes higher as it goes from the interface portion toward the membrane inner portion and the Si/Al ratio becomes lower as it goes from the membrane inner portion toward the surface portion. On the other hand, in the zeolite membrane complex in each of Comparative Examples 1 and 2, as shown in FIGS. 9A to 9B, the Si/Al ratio in the surface portion is higher than that in the membrane inner portion. Further, in the zeolite membrane complex in Comparative Example 3, as shown in FIG. 9C, the Si/Al ratio in the interface portion is almost equal to that in the membrane inner portion.

22 is evacuated. Further, a vacuum gauge 292 (Calibrator manufactured by GE Sensing, the model number: DPi800) is connected to the port 222 that is the other end portion of the housing 22 and the ultimate degree of vacuum is measured. At that time, the port 223 provided in the side surface of the housing 22 is open to atmosphere. Subsequently, the zeolite membrane complex taken out from the housing 22 is immersed in high-temperature water (180° C.) for 12 hours and then washed by ion exchange water and dried at room temperature for 12 hours or more. After that, the degree of vacuum is measured again and the ratio of the degree of vacuum after the immersion to the degree of vacuum before the immersion (hereinafter, referred to as a "ratio of the degrees of vacuum before and after immersion") is determined as an index of the hydrothermal resistance. In Table 3, when the ratio of the degrees of vacuum before and after immersion is not lower than 95%, the evaluation is "○ (circle)", when the ratio is lower than 95% and not lower than 90%, the evaluation is "Δ (triangle)", and when the ratio is lower than 90%, the evaluation is "x (cross)".

In the zeolite membrane complex in each of Examples 1 to 5 and Comparative Examples 1 and 3, the ratio of the degrees of vacuum before and after immersion is not lower than 90%, and thus high hydrothermal resistance is achieved. Especially, in the zeolite membrane complex in each of Examples 1 to 3 and Comparative Example 3 where the ratio (La/T) of the length La of the high Si/Al ratio range is not lower than 25% and the maximum Si/Al ratio is not lower than 180, the ratio of the degrees of vacuum before and after immersion is not lower than 95%. In Comparative Example 2, the ratio of the degrees of vacuum before and after immersion is lower than 90%, and thus the hydrothermal resistance is low.

(Evaluation of Adhesion)

Adhesive tape defined by JIS Z 1522 is attached to a surface of the zeolite membrane, and after tearing off the adhesive tape, the surface of the zeolite membrane is observed by a scanning electron microscope (SEM). In Table 3, when membrane peeling is not recognized, the evaluation is "○ (circle)", when a slightly peeled membrane having a maximum width smaller than μm is recognized, the evaluation is "Δ (triangle)", and when a largely peeled membrane having a maximum width not smaller than 10 μm is recognized, the evaluation is "x (cross)".

In the zeolite membrane complex in each of Examples 1 to 5 and Comparative Examples 1 and 2, no largely peeled membrane is recognized and the zeolite membrane having increased adhesion is obtained. Further, in the zeolite membrane complex in each of Examples 1 and 3 to 5 and Comparative Examples 1 and 2 where the ratio (Lb/T) of the length Lb of the interface-side specified range is not lower than 30%, no membrane peeling occurs. In Comparative Example 3, large membrane peeling is recognized and the adhesion is low.

As described above, the zeolite membrane complex 1 includes the porous support 11 and the zeolite membrane 12 formed on the support 11. In the zeolite membrane 12, the Si/Al ratio which is a molar ratio becomes higher as it goes from the interface portion 121 with the support 11 toward the membrane inner portion, and the Si/Al ratio becomes lower as it goes from the membrane inner portion toward the surface portion 122 opposite to the support 11. As shown in above-described Examples 1 to 5, it is thereby possible to achieve the zeolite membrane complex 1 having high water flux and high hydrothermal resistance and capable of suppressing membrane peeling.

Preferably, in the change in the Si/Al ratio in the thickness direction in the zeolite membrane 12, the length of the range in which the Si/Al ratio is two times or more as high as the Si/Al ratio in the surface portion 122 is 25% or more of the thickness of the zeolite membrane 12. Thus, since the zeolite membrane 12 contains many zeolites having high Si/Al ratio, it is possible to more reliably improve the hydrothermal resistance of the zeolite membrane 12.

Preferably, in the change in the Si/Al ratio in the thickness direction in the zeolite membrane 12, the maximum Si/Al ratio is 180 or more. Thus, since the zeolite membrane 12 contains zeolites having sufficiently high Si/Al ratio, it is possible to further improve the hydrothermal resistance of the zeolite membrane 12.

Preferably, the Si/Al ratio in the surface portion 122 of the zeolite membrane 12 is 120 or less. It is thereby possible to improve the hydrophilic property of the surface portion 122 and more reliably improve the water flux.

Preferably, in the change in the Si/Al ratio in the thickness direction in the zeolite membrane 12, the length of the range between a position at which the Si/Al ratio as it goes from the interface portion 121 toward the membrane inner portion first becomes ½ of the maximum Si/Al ratio of the zeolite membrane 12 and the support 11 is 25% or more of the thickness of the zeolite membrane 12. Thus, since the Si/Al ratio is low within a wide range in the vicinity of the interface portion 121, it is possible to more reliably suppress membrane peeling and improve adhesion of the zeolite membrane 12.

Further, it is preferable that the zeolite forming the zeolite membrane 12 should be an 8-membered ring zeolite. It is thereby possible to suitably achieve selective permeation of a target substance to be permeated (especially, water) having a relatively small molecular diameter in the zeolite membrane complex 1.

Herein, a method of producing the zeolite membrane complex in Comparative Example will be described. In the production method in Comparative Example, a zeolite membrane having a multilayer structure is formed. Specifically, a first zeolite layer having a low Si/Al ratio is formed on the support by using one starting material solution, a second zeolite layer having a high Si/Al ratio is formed on the first zeolite layer by using another starting material solution, and a third zeolite layer having a low Si/Al ratio is formed on the second zeolite layer by using still another starting material solution. A zeolite membrane having a multilayer structure and having a low Si/Al ratio both in an interface portion and a surface portion can be thereby obtained. In the zeolite membrane having the multilayer structure, the Si/Al ratios are discontinuous at a boundary between adjacent zeolite layers. In the production method in Comparative Example, since formation of the zeolite layer is repeated, it disadvantageously takes a long time to produce a zeolite membrane complex.

In contrast to this, the above-described method of producing the zeolite membrane complex 1 includes a step of preparing the starting material solution by mixing the Si source and the two types of Al sources having different solubilities in water into water (Step S13), a step of immersing the porous support 11 in the starting material solution (Step S14), and a step of forming the zeolite membrane 12 on the support 11 by heating the starting material solution (Step S15). In Step S15, the hydrothermal synthesis is performed at a temperature at which substantially all of one of the two types of Al sources contained in the starting material solution is dissolved and at least part of the other Al source is not dissolved and then the hydrothermal synthesis is performed at another temperature higher than the temperature. It is thereby possible to easily form the above-described zeolite membrane 12 having a low Si/Al ratio both in the interface portion 121 and the surface portion 122 and efficiently produce the zeolite membrane complex 1 without repeating formation of the zeolite layer like in Comparative Example.

The above-described separation method includes a step of preparing the zeolite membrane complex 1 (Step S21) and a step of supplying the mixed substance containing a plurality of types of gases or liquids to the zeolite membrane complex 1 and causing the substance with high permeability in the mixed substance to permeate the zeolite membrane complex 1, to be separated from any other substance (Step S22). In the separation method using the zeolite membrane complex 1 having high water flux and high hydrothermal resistance and capable of suppressing membrane peeling, it is possible to efficiently and stably perform separation of various mixed substances. The separation method using the zeolite membrane complex 1 is especially suitable for separation of the mixed substance including water.

In the zeolite membrane complex 1, the method of producing zeolite membrane complex 1, and the separation method described above, various modifications can be made.

Only if the zeolite membrane complex 1 having high water flux and high hydrothermal resistance and capable of suppressing membrane peeling can be achieved, in the zeolite membrane 12, the ratio (La/T) of the length La in the high Si/Al ratio range may be lower than 25%, and the maximum Si/Al ratio may be lower than 180. Similarly, the Si/Al ratio in the surface portion 122 may be higher than 120, and the ratio (Lb/T) of the length Lb in the interface-side specified range may be lower than 25%.

The maximum number of membered rings of the zeolite forming the zeolite membrane 12 may be smaller than 8 or larger than 8.

The zeolite membrane complex 1 may further include a function layer or a protective layer laminated on the zeolite membrane 12, additionally to the support 11 and the zeolite membrane 12. Such a function layer or a protective layer may be an inorganic membrane such as the zeolite membrane, a silica membrane, a carbon membrane, or the like or an organic membrane such as a polyimide membrane, a silicone membrane, or the like. Further, a substance that is easy to adsorb water may be added to the function layer or the protective layer laminated on the zeolite membrane 12.

Figure 4:
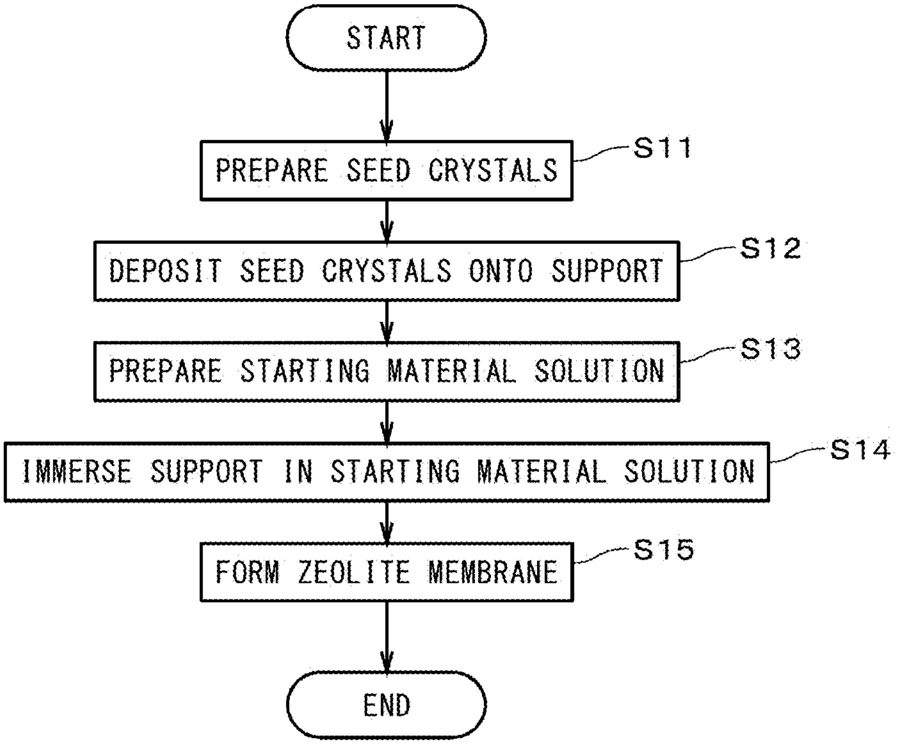
FIG. 4 is a flowchart showing a flow of producing the zeolite membrane complex.

In the production of the zeolite membrane complex 1 shown in FIG. 4, the process steps (Steps S11 and S12) in which the seed crystals are deposited onto the support 11 may be omitted and the zeolite membrane 12 can be directly formed on the support 11 in the process of Step S15. The zeolite membrane complex 1 may be produced by any method other than the production method shown in FIG. 4.

In the separation method, the separation of the mixed substance may be performed by a vapor permeation method, a reverse osmosis method, a gas permeation method, or the like other than the pervaporation method exemplarily shown in the above description. Further, any substance other than the substances exemplarily shown in the above description may be separated from the mixed substance.

The configurations in the above-described preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The zeolite membrane complex of the present invention can be used, for example, as a dehydration membrane, and can be further used in various fields in which zeolite is used as a separation membrane for any of various substances other than water, an adsorption membrane for any of various substances, or the like.

REFERENCE SIGNS LIST

1 Zeolite membrane complex
11 Support
12 Zeolite membrane
121 Interface portion
122 Surface portion
S11 to S15, S21, S22 Step

The invention claimed is:

1. A zeolite membrane complex, comprising:
a porous support; and
a zeolite membrane formed on said support,
wherein in said zeolite membrane, a Si/Al ratio which is a molar ratio becomes higher as it goes from an interface portion with said support toward a membrane inner portion and the Si/Al ratio becomes lower as it goes from said membrane inner portion toward a surface portion opposite to said support.

2. The zeolite membrane complex according to claim 1, wherein
in a change in the Si/Al ratio in a thickness direction in said zeolite membrane, a length of a range in which the Si/Al ratio is two times or more as high as the Si/Al ratio in said surface portion is 25% or more of a thickness of said zeolite membrane.

3. The zeolite membrane complex according to claim 1, wherein
in a change in the Si/Al ratio in a thickness direction in said zeolite membrane, a maximum Si/Al ratio is 180 or more.

4. The zeolite membrane complex according to claim 1, wherein
the Si/Al ratio in said surface portion of said zeolite membrane is 120 or less.

5. The zeolite membrane complex according to claim 1, wherein
in a change in the Si/Al ratio in a thickness direction in said zeolite membrane, a length of a range between a position at which the Si/Al ratio from said interface portion toward said membrane inner portion first becomes ½ of a maximum Si/Al ratio of said zeolite membrane and said support is 25% or more of a thickness of said zeolite membrane.

6. The zeolite membrane complex according to claim 1, wherein
zeolite forming said zeolite membrane is an 8-membered ring zeolite.

7. A method of producing the zeolite membrane complex according to claim 1, comprising:
a) preparing a starting material solution by mixing a Si source and two types of Al sources having different solubilities in water into water;
b) immersing a porous support in said starting material solution; and
c) forming a zeolite membrane on said support by heating said starting material solution,
wherein hydrothermal synthesis is performed at a temperature at which all of one Al source of said two types of Al sources contained in said starting material solution is dissolved and at least part of the other AI source is not dissolved and then hydrothermal synthesis is performed at another temperature higher than said temperature in said operation c).

8. A separation method, comprising:
a) preparing the zeolite membrane complex according to claim 1; and
b) supplying a mixed substance containing a plurality of types of gases or liquids to said zeolite membrane complex and causing a substance with high permeability in said mixed substance to permeate said zeolite membrane complex, to be separated from any other substance.

* * * * *